United States Patent
Harada

(10) Patent No.: US 7,944,589 B2
(45) Date of Patent: May 17, 2011

(54) IMAGE FORMING APPARATUS

(75) Inventor: Hiroyuki Harada, Osaka (JP)

(73) Assignee: Kyocera Mita Corporation (JP)

( * ) Notice: Subject to any disclaimer, the term of this patent is extended or adjusted under 35 U.S.C. 154(b) by 943 days.

(21) Appl. No.: 11/891,201

(22) Filed: Aug. 9, 2007

(65) Prior Publication Data
US 2008/0037079 A1 Feb. 14, 2008

(30) Foreign Application Priority Data

Aug. 10, 2006 (JP) .................... 2006-218606

(51) Int. Cl.
*H04N 1/04* (2006.01)
(52) U.S. Cl. ........ 358/474; 358/498; 358/497; 358/496; 358/501; 382/232; 399/380
(58) Field of Classification Search .............. 358/474, 358/486, 497, 496, 498, 482, 483, 501, 505, 358/461, 1.13; 382/232, 108, 112; 399/380
See application file for complete search history.

(56) References Cited

U.S. PATENT DOCUMENTS

| | | | | |
|---|---|---|---|---|
| 4,616,382 A | * | 10/1986 | Van Woensel et al. | 452/5 |
| 4,641,357 A | * | 2/1987 | Satoh | 382/317 |
| 4,682,936 A | * | 7/1987 | Suzuki et al. | 417/366 |
| 5,535,023 A | * | 7/1996 | Yamazaki | 359/2 |
| 6,301,019 B1 | * | 10/2001 | Saito et al. | 358/461 |
| 6,563,938 B1 | * | 5/2003 | Harada | 382/108 |
| 7,719,726 B2 | * | 5/2010 | Kamei et al. | 358/463 |
| 2003/0223780 A1 | * | 12/2003 | Kobayashi | 399/196 |
| 2007/0285690 A1 | * | 12/2007 | Matsuda et al. | 358/1.9 |
| 2007/0291324 A1 | * | 12/2007 | Kamei et al. | 358/474 |
| 2008/0018958 A1 | * | 1/2008 | Kurokawa | 358/474 |

FOREIGN PATENT DOCUMENTS

| | | |
|---|---|---|
| JP | 10-56542 | 2/1998 |
| JP | 2000-196814 | 7/2000 |
| JP | 2000-310820 | 11/2000 |
| JP | 2005-123915 | 5/2005 |

* cited by examiner

*Primary Examiner* — Negussie Worku
(74) *Attorney, Agent, or Firm* — Gerald E. Hespos; Michael J. Porco

(57) ABSTRACT

An image forming apparatus is capable of accurately reading out a document without various data transmission between a document feeding section and a document reading section. The reading position setter sets a fresh document reading position (RP3) at a position where no foreign object (F) adheres. A shift distance calculator calculates a shift distance (Z) between an upstream-most reading position (RP2) and the refresh document reading position (RP3). A delay time calculator calculates delay time based on the calculated shift distance (Z). A start signal sender instructs the document reading section to start reading a document (P) when the leading end of the document (P) reaches the upstream-most reading position (RP2). An ASIC outputs the instruction to start reading the document to an A/D with a delay of the feed delay time found by the delay time calculator to instruct an image sensor to start reading the document (P).

5 Claims, 5 Drawing Sheets

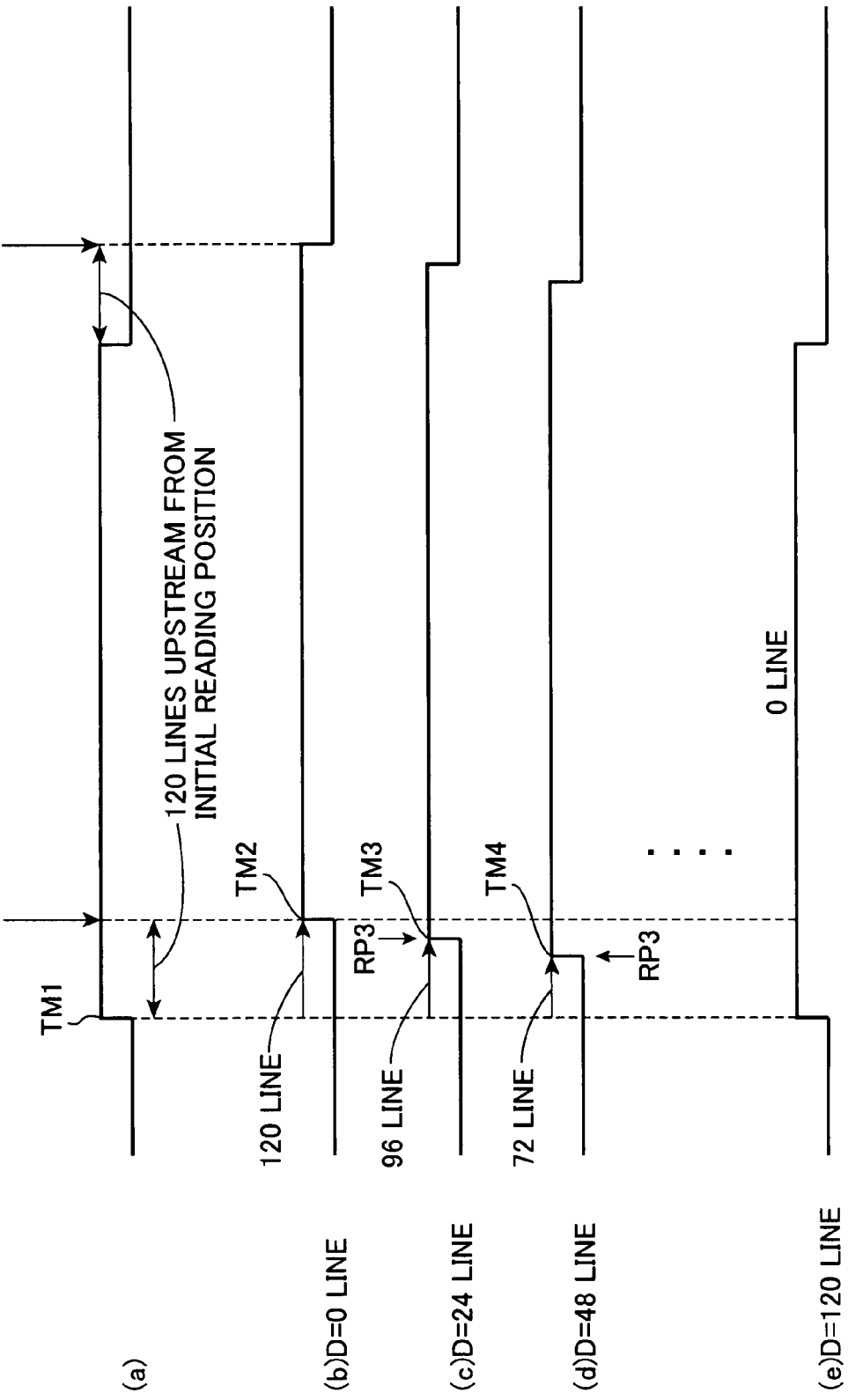

US 7,944,589 B2

IMAGE FORMING APPARATUS

BACKGROUND OF THE INVENTION

1. Field of the Invention

The present invention relates to image forming apparatuses having an image reading function, such as a facsimile apparatus, a copying machine, a scanner, and a digital complex machine.

2. Description of the Related Art

Conventionally, there has been a known image forming apparatus including a document feeding section of a sheet-through type and a document reading section for reading a document fed by the document feeding section. In such image forming apparatus, when foreign objects such as a spot of whiteout and dust adhere on a document reading position, such foreign object is included into image data of the read document as a black line. Therefore, a technology for preventing such inclusion of black line in image data is disclosed in Japanese Patent Unexamined Publication No. 2000-196814. According to this technology, foreign objects adhered on a document reading position are detected, and the document reading position is moved to a position where no foreign object adheres. Then, a document reading start timing is delayed in accordance with the moving distance of the document reading position.

Further, according to a technology disclosed in Japanese Patent Unexamined Publication No. 2000-310820, an image of a reference plate is read out, and it is determined that a foreign object is adhered on a document reading position when a density of the read image of the reference plate is equal to or higher than a predetermined density. Then, an image reading position is set to be at a position where no foreign object adheres.

In these conventional image forming apparatuses, the document feeding section notifies the document reading section that a document is placed when the sheet sensor of the document feeding section detects the document placed on the document holding portion. Then, the document reading section notifies moving distance information indicating a moving distance of the document reading position to the document feeding section. The document feeding section delays the feed start timing of the document in accordance with the received moving distance information such that the document arrives at the document reading position when the document reading section outputs an instruction to start reading the document to the image sensor.

However, in the conventional image forming apparatuses, since various data such as moving distance information are transmitted between the document feeding section and the document reading section as described above, and both sections are serially connected, there has been a problem that loss of communication is likely to occur, and successive reading of documents cannot be performed efficiently.

SUMMARY OF THE INVENTION

An object of the present invention is to provide an image forming apparatus capable of reading a document accurately without transmission of various data between the document feeding section and the document reading section.

An image forming apparatus according to one aspect of the present invention comprises: a document feeding section for feeding a document at a predetermined feeding speed; and a document reading section for reading a document at a document reading position, the document reading section including: a reading position setter which determines whether or not dirt adheres on an instant document reading position, and sets a fresh document reading position at a location within a predetermined reading position shiftable range of a document feeding path where no dirt adheres when dirt is determined to adhere on the instant document reading position; an image sensor; a shift distance calculator which calculates a shift distance between the fresh document reading position and the upstream-most position of the reading position shiftable range; a delay time calculator which calculates a delay time based on the feeding speed and the calculated shift distance; and wherein the document feeding section includes a start signal sender which sends a start signal to the document reading section when a predetermined portion of the document being fed reaches the upstream end of the reading position shiftable range, and the document reading section further includes a reading controller which allows the image sensor to start reading of the document after the elapse of the delay time from the reception of the start signal.

According to the above-described image forming apparatus, a document can be read out accurately without transmission of various data between the document feeding section and the document reading section.

These and other objects, features and advantages of the present invention will become more apparent upon reading of the following detailed description along with the accompanied drawings.

BRIEF DESCRIPTION OF DRAWINGS

FIG. 5 is a timing chart of a document reading signal.

DETAILED DESCRIPTION OF THE PREFERRED EMBODIMENTS

Figure 1:
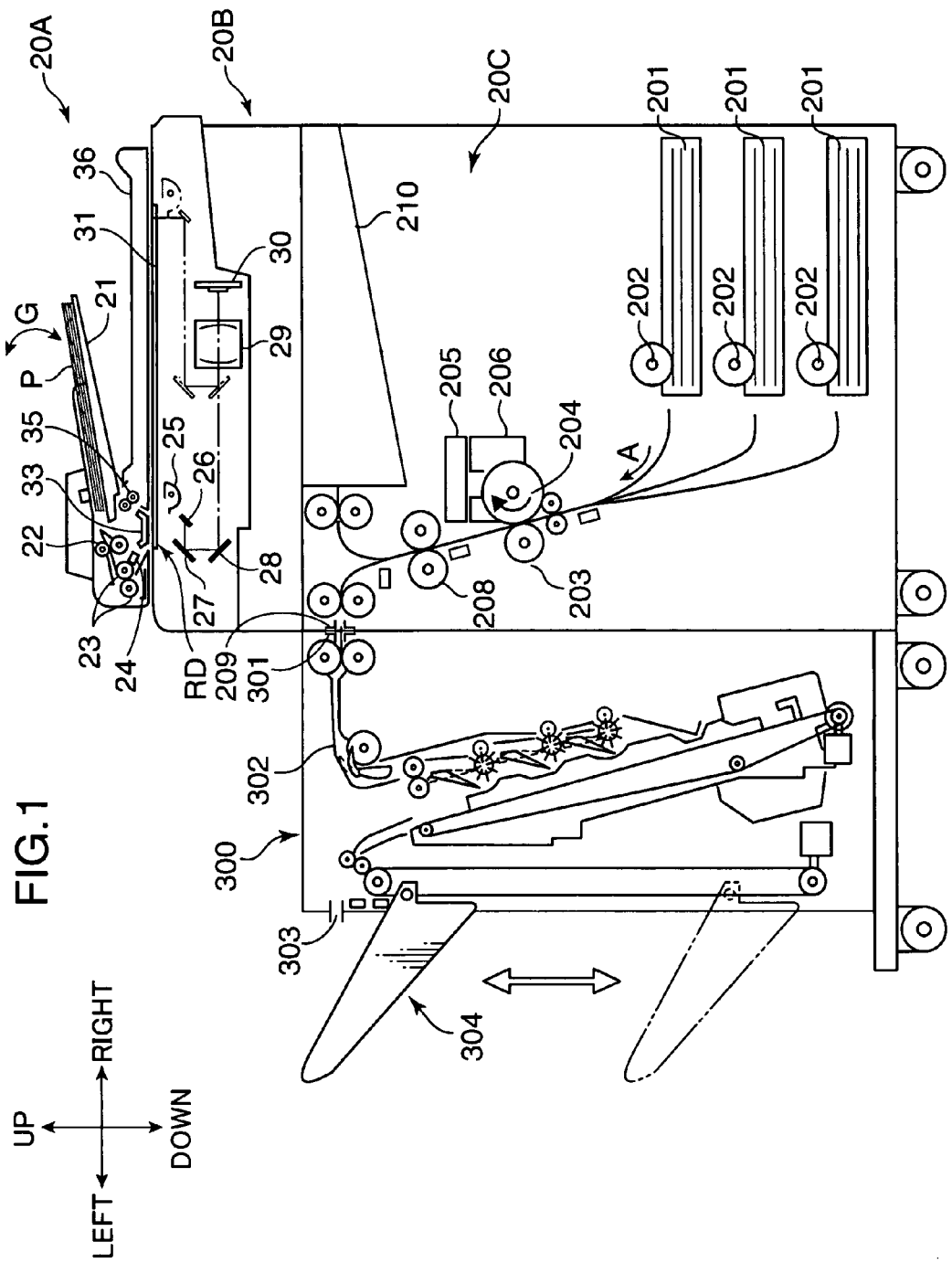
FIG. 1 shows an overall configuration of an image forming apparatus according to an embodiment of the present invention.

Hereinafter, an embodiment of the present invention will be described with reference to the drawings. The same or similar parts are identified with the same or similar reference numerals, and descriptions of the items identified with the same or similar reference numerals may be appropriately omitted.

FIG. 1 shows an overall configuration of an image forming apparatus according to an embodiment of the present invention. The image forming apparatus includes a document feeding section 20A provided openably and closably in the direction indicated by an arrow G, a document reading section 20B for reading out a document fed by the document feeding section 20A, and a main apparatus 20C for printing an image of the document read out by the document reading section 20B onto a recording sheet.

The document feeding section 20A is composed of a document feeding section of a sheet-through type and includes a document holding portion 21 capable of holding a plurality of documents P, a pair of sheet-feeding rollers 22 for picking up the placed documents P one after another, a pair of registration rollers 23 for feeding the picked documents P to a document reading area RD at a constant feeding speed, restricting diagonal feed of the document P and aligning a leading end of the document P, and a pair of discharging rollers 35 for discharging the document P whose image data is read out by an image sensor 30 to a document discharging tray 36. At a portion of the document feeding section 20A facing the document reading area RD, there is provided a plate-like white background plate 33 which is longitudinal in a direction perpendicular to the face of the drawing (main scanning direction). At a portion on the feeding path of the document P and on upstream near the background plate 33, there is provided a sensor 24 for detecting a leading end and rear end of the fed document P.

The document reading section 20B includes a lamp 25 slidably arranged under the contact glass 31, and an image sensor 30 for receiving a reflected light ray reflected from the document P at the document reading area RD through mirrors 26, 27, 28 and a collective lens 29. Further, on an upper surface of the document reading section 20B, there is provided a plate-like transparent contact glass 31.

In an automatic reading mode of reading out the document P placed on the document holding portion 21, the lamp 25 irradiates a light ray to the document P fed one after another by the pair of sheet-feeding rollers 22 at a home position which is located on the right side near the document reading area RD. The image sensor 30 reads out the reflected light ray in units of lines. In a manual reading mode of reading out a document placed on the contact glass 31, the lamp 25 irradiates a light ray to the document P and moves rightward at a constant speed with a drive force applied by an unillustrated motor. The image sensor 30 reads the reflected light ray reflected from the document P in units of lines. When the lamp 25 moves to the position indicated by the dotted line, for example, it stops irradiation of the light ray and moves leftward at a constant speed with a drive force applied by the unillustrated motor to go back to the home position.

The main apparatus 20C includes a plurality of sheet-feeding cassettes 201, a plurality of sheet-feeding rollers 202, a transferring roller 203, a photoconductive drum 204, an exposing device 205, a developing device 206, a fixing roller 208, a discharging outlet 209, and a discharging tray 210.

The photoconductive drum 204 rotates in a direction of arrow and is uniformly charged with electricity by a charging device (unillustrated). The exposing device 205 converts a modulation signal created based on image data of the document P read out by the image sensor 30 into a laser light ray and outputs the same to form an electrostatic latent image on the photoconductive drum 204. The developing device 206 supplies toner particles to the photoconductive drum 204 to form a toner image.

On the other hand, each of the sheet feeding rollers 202 picks a recording sheet from the sheet-feeding cassette 201 storing the recording sheet and feeds the same to the transferring roller 203. The transferring roller 203 allows the toner image formed on the photoconductive drum 204 to transfer onto the fed recording sheet, and the fixing roller 208 heats the transferred toner image and allows the same to fix onto the recording sheet. Thereafter, the recording sheet is transferred to a sheet post-processing portion 300 through the discharging outlet 209 of the main apparatus 20C. The recording sheet is discharged to the discharging tray 210 when desired.

The sheet post-processing portion 300 includes an inlet opening 301, a sheet feeding portion 302, an outlet opening 303 and a stack tray 304. The sheet feeding portion 302 successively feeds recording sheets fed through the discharging outlet 209 and the inlet opening 301, and discharges the recording sheet to the stack tray through the outlet opening 303. The stack tray 304 is operable to move upward and downward in the direction of arrow in accordance with the number of stacked recording sheets fed out through the outlet opening 303.

Figure 2:
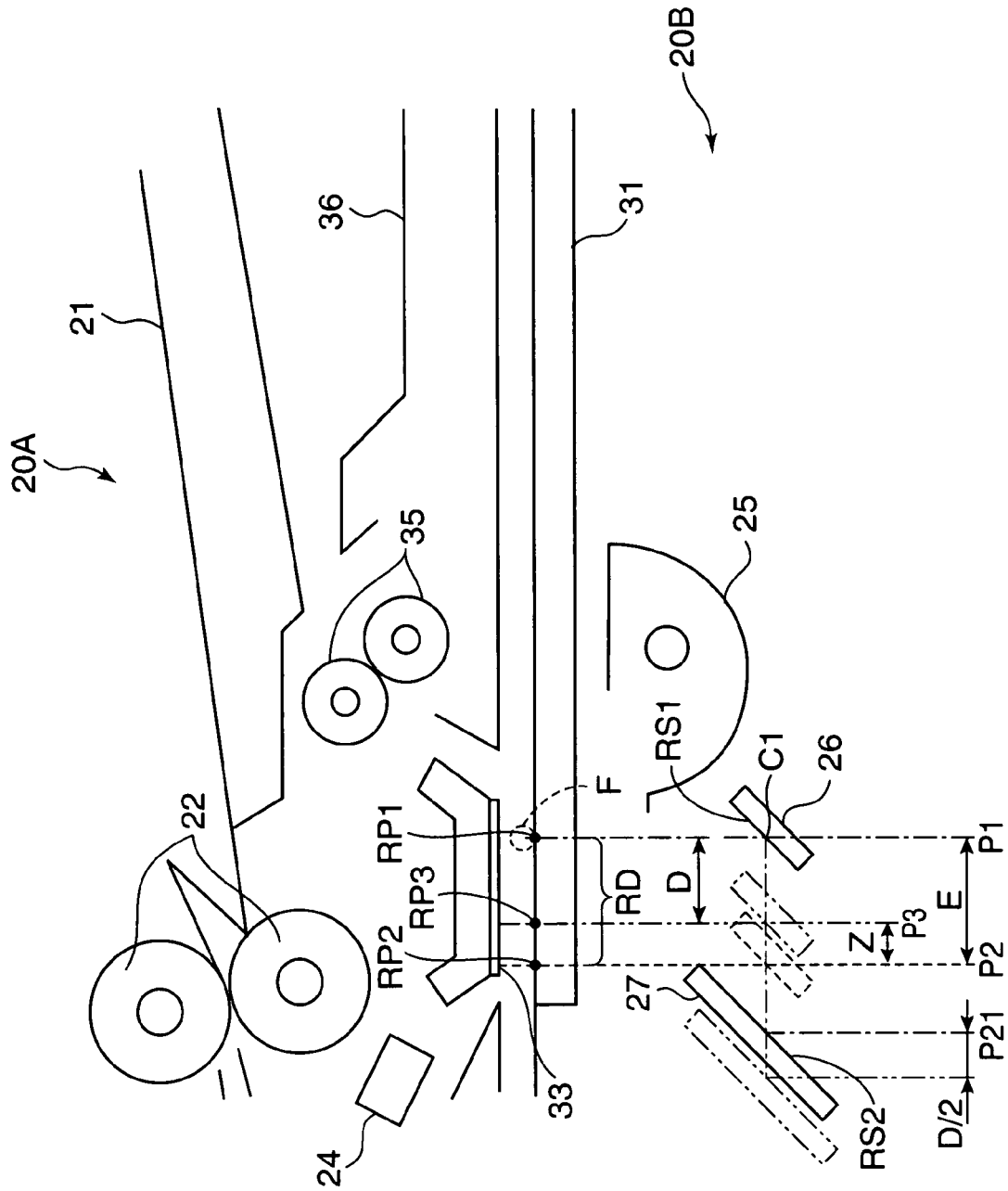
FIG. 2 is an enlarged view showing the periphery of a document reading area.

FIG. 2 is an enlarged view showing the periphery of the document reading area RD shown in FIG. 1. As shown in FIG. 2, the mirror 26 is composed of a plate-like mirror which is longitudinal in the main scanning direction, and its reflective surface RS1 slopes approximately forty-five degrees from a horizontal plane. Further, the mirror 26 is slidable in a horizontal direction between a position P1 and a position P2 which is located at upstream from the position P1 on the feeding path of the document P. When the mirror 26 is located at the position P1, the straight line identified with RP1 and extending in the main scanning direction is designated as an initial reading position RP1. The initial reading position RP1 is located at an intersection between a vertical plane, which passes through the center C1 of the mirror 26 and a straight line parallel to the main scanning direction, and an upper surface of the contact glass 31.

Similarly, when the mirror 26 is located at the position P2, the straight line identified with RP2 and extending in the main scanning direction is designated as an upstream-most reading position RP2. Further, the document reading area RD indicates a rectangular area having the initial reading position RP1 and the upstream-most reading position RP2 as opposing two sides. When the position P1 is the initial position of the mirror 26 and a foreign object F such as a scar, dust, and a spot of whiteout adheres on the initial reading position RP1, the mirror 26 slides toward upstream of the feeding path of the document P and positions itself at a position on the contact glass 31 where the foreign object F does not adhere. Accordingly, inclusion of a black line in image data of the document P can be prevented.

In the automatic document reading mode, the lamp 25 is positioned on the right side near the document reading area RD and irradiates a light ray to the document reading area RD to thereby irradiate the light ray to the document P which passes through the document reading area RD. The mirror 26 receives a reflected light ray from the document P, changes orientation of optic axis by ninety degrees in a counter-clockwise direction, and then leads the light ray to the mirror 27.

Similarly to the mirror 26, the mirror 27 is arranged slidably in a horizontal direction and includes a plate-like mirror which is longitudinal in the main scanning direction, and its reflective surface RS2 slopes approximately forty-five degrees from a horizontal plane. Here, the mirror 27 slides a distance D/2 leftward from a position P21 when the mirror 26 slides, for example, from the position P1 to a position P3 which is a distance D apart from the position P1. Accordingly, regardless of the position of the mirror 26, a length of a light path of the reflected light ray from the document P to the image sensor 30 can be kept constant.

Figure 3:
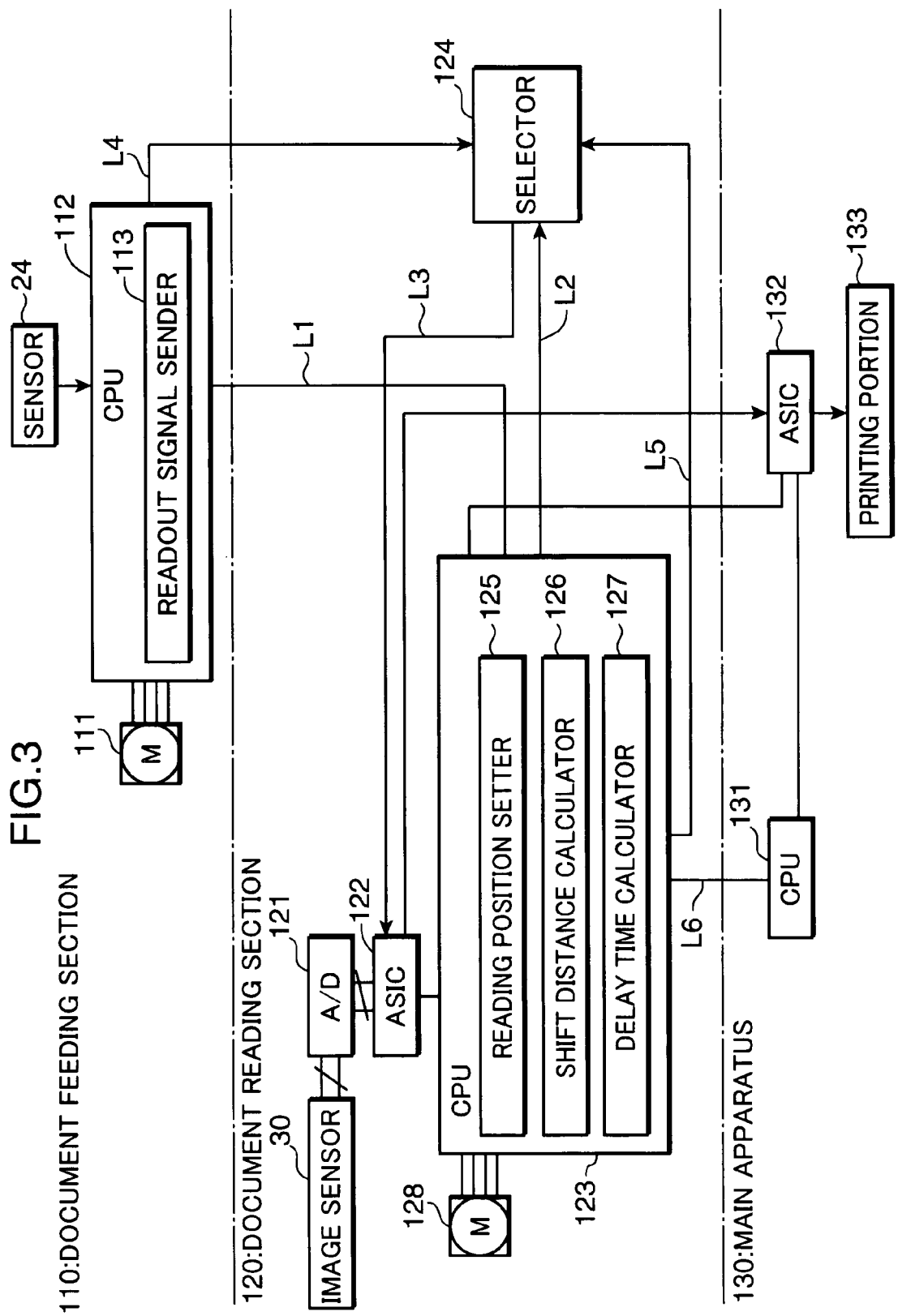
FIG. 3 is a block diagram showing an electric configuration of the image forming apparatus.

FIG. 3 is a block diagram showing an electric configuration of the image forming apparatus. The image forming apparatus includes a document feeding section 110, a document reading section 120, and a main apparatus 130. The document feeding section 110 is composed of the document feeding section 20A shown in FIG. 1 and includes a motor unit 111 and a CPU 112. The CPU 112 is connected to a CPU 123 through a line L1 and transmits and receives various data to and from the CPU 123. Further, the CPU 112 is connected to a selector 124 through a line L4 and outputs an image reading signal to the selector 124.

The motor unit 111 includes three motors which drive the pair of sheet-feeding rollers 22, the pair of registration rollers 23, and the pair of discharging rollers 35 shown in FIG. 1, respectively. Under control of the CPU 112, the motor unit 111 allows the document P placed on the document holding portion 21 to move to the document reading area RD. After the image sensor 30 reads the document P, the motor unit 111 allows the document P to be discharged to the document discharging tray 36.

The CPU 112 includes a readout signal sender (reading start instructing portion) 113 and executes an overall control of the document feeding section 110. The readout signal sender 113 raises a document readout signal and outputs the raised document readout signal to the selector 124 through the line L4 to instruct the document reading section 120 to start reading the document P when a predetermined time passes after the sensor 24 detects the leading end of the document P and the leading end of the document P reaches the upstream-most reading position RP2. Further, the readout signal sender 113 lowers a document readout signal and outputs the lowered document readout signal to the selector 124 through the line L4 to terminate the reading of the document P when a predetermined time passes after the sensor 24 detects a rear end of the document P and the rear end of the document P reaches the upstream-most reading position RP2. The sensor 24 is composed of a reflective photo-sensor and detects the leading end and rear end of the document P.

The document reading section 120 is composed of the document reading section 20B shown in FIG. 1 and includes the image sensor 30, an analog/digital converter (A/D) 121, an ASIC (reading controller) 122, the CPU 123, the selector 124 and a motor 128.

The image sensor 30 is composed of a plurality of CCD, CIS or the like whose light-receiving elements are aligned in the main scanning direction. The image sensor 30 receives a reflected light ray reflected from the document P through the mirrors 26, 27, 28 and the collective lens 29, reads out the document P in units of lines, and outputs the read image data to the A/D 121 in units of pixels. Further, the image sensor 30 receives a reflected light ray irradiated from the lamp 25 and reflected from the background plate 33 through the contact glass 31 and outputs the received data as image data of the document reading area RD to the ASIC 122 so as to allow the document reading section 120 to set the document reading position at the position where the foreign object F do not adhere.

The A/D 121 converts analog image data outputted from the image sensor 30 into digital image data having the predetermined number of bits and outputs the digital image data to the ASIC 122. Here, each of the pixels constituting the image data converted from analog to digital by the A/D 121 is presented with a pixel value (tone) between 0 through 255, and the pixel value gets smaller as the pixel receives a light ray having a high light intensity. Thus, since the foreign object F which adheres on the contact glass 31 intercepts a reflected light ray reflected from the background plate 33, the pixel value of the foreign object F becomes higher than that of a part where the foreign object F do not adhere.

The CPU 123 includes a reading position setter 125, a shift distance calculator 126 and a delay time calculator 127 and executes an overall control of the document reading section 120.

The motor 128 is composed of, for example, a stepping motor and allows the mirrors 26, 27 to move in accordance with a pulse signal outputted from the CPU 123.

The reading position setter 125 controls the motor 128 to slide the mirror 26 from the position P1 toward the upstream of the feeding path of the document P at interval of a predetermined distance. The reading position setter 125 allows the image sensor 30 to read image data of one line of the document reading area RD at each time when it slides the mirror 26 at interval a predetermined distance. Then, the reading position setter 125 detects from the obtained image data a position where the foreign object F does not adhere in the document reading area RD, and sets the detected position as a fresh document reading position RP3.

Specifically, the reading position setter 125 determines that the foreign object F adheres on the contact glass 31 when image data of the document reading area RD includes a pixel which is larger than a reference pixel value showing a pixel value of the foreign object F. Here, the predetermined numbers of pixels each having a pixel value larger than the reference pixel value exist successively in image data of one line of the document reading area RD, the reading position setter 125 determines that the foreign object F adheres on the contact glass 31. When a pixel which is larger than the reference pixel value exists but a predetermined numbers of the pixels do not exist successively, the reading position setter 125 may determine that the pixel presents a noise but the foreign object F.

It should be noted that the reading position setter 125 may increase the slide distance successively when it slides the mirror 26 from the initial reading position RP1 toward the upstream. Further, in place of the above-described method, the reading position setter 125 may detect the foreign object F and determine the slide distance by using any one of the methods disclosed in Japanese Patent Unexamined Publication Nos. 2000-19814 and 2000-310820.

As shown in FIG. 2, the shift distance calculator 126 finds the distance D between the initial reading position RP1 and the fresh document reading position RP3 set by the reading position setter 125 and subtracts the found distance D from the distance E between the upstream-most reading position RP2 and the initial reading position RP1 to determine an shift distance Z between the fresh document reading position RP3 and the upstream-most reading position RP2. It should be noted that the distance E between the upstream-most reading position RP2 and the initial reading position RP1 is a fixed value. Further, the shift distance calculator 126 determines the distance D in accordance with the number of pulses of the pulse signals outputted from the CPU 123 to the motor 128.

The delay time calculator 127 shown in FIG. 3 divides the shift distance Z determined in the shift distance calculator 126 by a feeding speed c of the document P to find the time (feed delay time) taken by the leading end of the document P to reach the fresh document reading position RP3 after passing the upstream-most reading position RP2.

The ASIC 122 outputs an instruction to start reading the document P to the A/D 121 with a delay of the feed delay time found by the delay time calculator 127 to instruct the image sensor 30 to start reading the document P. The ASIC 122 can also allow the image sensor 30 to read out the document P in accordance with a document readout signal received from the CPU 131 of the main apparatus 130 through a line L6, the CPU 123, a line L5, the selector 124 and the line L3. However, in the present embodiment, the ASIC 122 allows the image sensor 30 to read the document in accordance with a document readout signal outputted from the CPU 112 of the document feeding section 110.

Further, the ASIC 122 applies image processing such as a shading correction to image data of the document P outputted from the A/D 121 and outputs the same to an ASIC 132. Furthermore, when the ASIC 122 receives image data of the document reading area RD from the A/D 121, it outputs the image data to the CPU 123.

The selector 124 receives a select signal from the CPU 123 through the line L2 and allows the ASIC 122 to connect to the CPU 112 or the CPU 123. In the present embodiment, since the ASIC 122 operates in accordance with a document readout signal received from the CPU 112, the selector 124 allows the ASIC 122 to connect to the CPU 112.

The CPU 131 executes an overall control of the main apparatus 130. Under control of the CPU 131, the ASIC 132 executes a predetermined image processing to image data outputted from the ASIC 122 and outputs the image data to a printing portion 133. The printing portion 133 includes the transferring roller 203, the photoconductive drum 204, the exposing device 205, and the developing device 206 shown in FIG. 1 and prints the image data outputted from the ASIC 132 onto a recording sheet.

Next, operation of the image forming apparatus at the time of reading out image data will be described with reference to the flowchart shown in FIG. 4. At first, before feeding the document P, the shift distance calculator 126 finds a distance D between the initial reading position RP1 and the fresh document reading position RP3 shown in FIG. 2, and determines a shift distance Z by subtracting the found distance D from a distance E (step S1). Next, the delay time calculator 127 divides the shift distance Z determined in step S1 by the feeding speed c of the document P to calculate the feed delay time (step S2).

Next, when the document P is placed on the document holding portion 21, and a user presses a start button, the CPU 111 of the document feeding section 110 allows the pair of sheet-feeding rollers 22 and the pair of registration rollers 23 to feed the document P at a constant feeding speed c (step S11).

Next, when the sensor 24 detects the leading end of the document P fed by the pair of sheet-feeding rollers 22 and the pair of registration rollers 23, the readout signal sender 113 raises a document readout signal and instructs the document reading section 120 to start reading the document P when a predetermined time passes after the leading end of the document P passes through the sensor 24 and reaches the upstream-most reading position RP2 (step S12).

Next, the ASIC 122 receives an instruction to read the document P through the selector 124 (step S3). Next, the ASIC 122 determines whether or not the feed delay time calculated in step S2 passes after it receives the instruction to start read the document P (step S4). When the feed delay time passes (YES in step S4), the ASIC 122 outputs the instruction to start reading the document P to the image sensor 30 through the A/D 121 to allow the image sensor 30 to start reading the document P (step S5). On the other hand, when the feed delay time does not pass after the ASIC 122 receives the instruction to start reading the document P from the readout signal sender 113 (NO in step S4), the routine returns to the processing of step S4. In other words, the ASIC 122 allows the readout signal sender 113 to delay an output of the document readout signal to the A/D 121 the feed delay time.

FIG. 5 shows a timing chart of a document readout signal. A reference symbol (a) in FIG. 5 shows a document readout signal outputted from the readout signal sender 113, and reference symbols (b) to (e) in FIG. 5 respectively show document readout signals outputted from the ASIC 122. The reference symbol (b) shows a case where the distance D shown in FIG. 2 is equal to zero. The reference symbol (c) shows a case where the distance D corresponds to a distance for twenty-four lines. The reference symbol (d) shows a case where the distance D corresponds to a distance for forty-eight lines. The reference symbol (e) shows a case where the distance D corresponds to a distance for a hundred and twenty lines.

The readout signal sender 113 assumes that the fresh document reading position RP3 is set at the upstream-most reading position RP2, and gives an instruction to start reading the document P. Here, the distance D between the upstream-most reading position RP2 and the initial reading position RP1 equals to a distance for a hundred and twenty lines, for example, in a sub-scanning direction of an image.

When the distance D equals to zero, in other words, when the fresh document reading position RP3 is set to be at the initial reading position RP1, the delay time calculator 127 calculates the time taken by the leading end of the document to proceed a distance corresponding to a hundred and twenty lines after reaching the upstream-most reading position RP2 (time TM1) as the feed delay time. Therefore, as shown in the reference symbol (b) of FIG. 5, the ASIC 122 outputs an instruction to start reading the document P to the A/D 121 to allow the image sensor 30 to start reading the document P when the leading end of the document P proceeds from the time TM1 a distance corresponding to a hundred and twenty lines (time TM2). Consequently, the image sensor 30 can start reading the document P when the leading end of the document P reaches the initial reading position RP1.

Further, when the distance D corresponds to a distance for twenty-four lines, in other words, when the fresh document reading position RP3 is set to be at a position upstream from the initial reading position RP1 a distance for twenty-four lines, the delay time calculator 127 calculates the time taken by the leading end of the document P to proceed a distance corresponding to ninety-six lines (=120−24) after reaching the upstream-most reading position RP2 (time TM1) as the feed delay time. Therefore, as shown in the reference symbol (c) of FIG. 5, the ASIC 122 outputs an instruction to start reading the document P to the A/D 121 to allow the image sensor 30 to start reading the document P when the leading end of the document P proceeds from the time TM1 a distance corresponding to ninety-six lines (time TM3). Consequently, the image sensor 30 can start reading the document P when the leading end of the document P reaches the fresh document reading position RP3.

Furthermore, when the distance D corresponds to a distance for forty-eight lines, in other words, when the fresh document reading position RP3 is set to be at a position upstream from the initial reading position RP1 a distance for forty-eight lines, the delay time calculator 127 calculates the time taken by the leading end of the document P to proceed a distance corresponding to seventy-two (120−48) lines after reaching the upstream-most reading position RP2 (time TM1) as the feed delay time. Therefore, as shown in the reference symbol (d) of FIG. 5, the ASIC 122 outputs to the A/D an instruction to start reading the document P to the A/D 121 to allow the image sensor 30 to start reading the document P when the leading end of the document P proceeds from the time TM1 a distance corresponding to seventy-two lines (time TM4). Consequently, the image sensor 30 can start reading the document P when the leading end of the document P reaches the fresh document reading position RP3.

Furthermore, when the distance D corresponds to a distance for a hundred and twenty lines, in other words, when the fresh document reading position RP3 is set to be at the upstream-most reading position RP2, the delay time calculator 127 calculates the feed delay time as zero. Therefore, as shown in the reference symbol (e) of FIG. 5, the ASIC 122 outputs a document readout signal to the A/D 121 without any delay and allows the image sensor 30 to start reading the document P. Consequently, the image sensor 30 can start reading the document P when the leading end of the document P reaches the upstream-most reading position RP2.

As described above, the read timing of the document P by the image sensor 30 becomes earlier as the distance D gets longer, and the image sensor 30 can start reading the document when the leading end of the document P reaches the fresh document reading position RP3.

Figure 4:
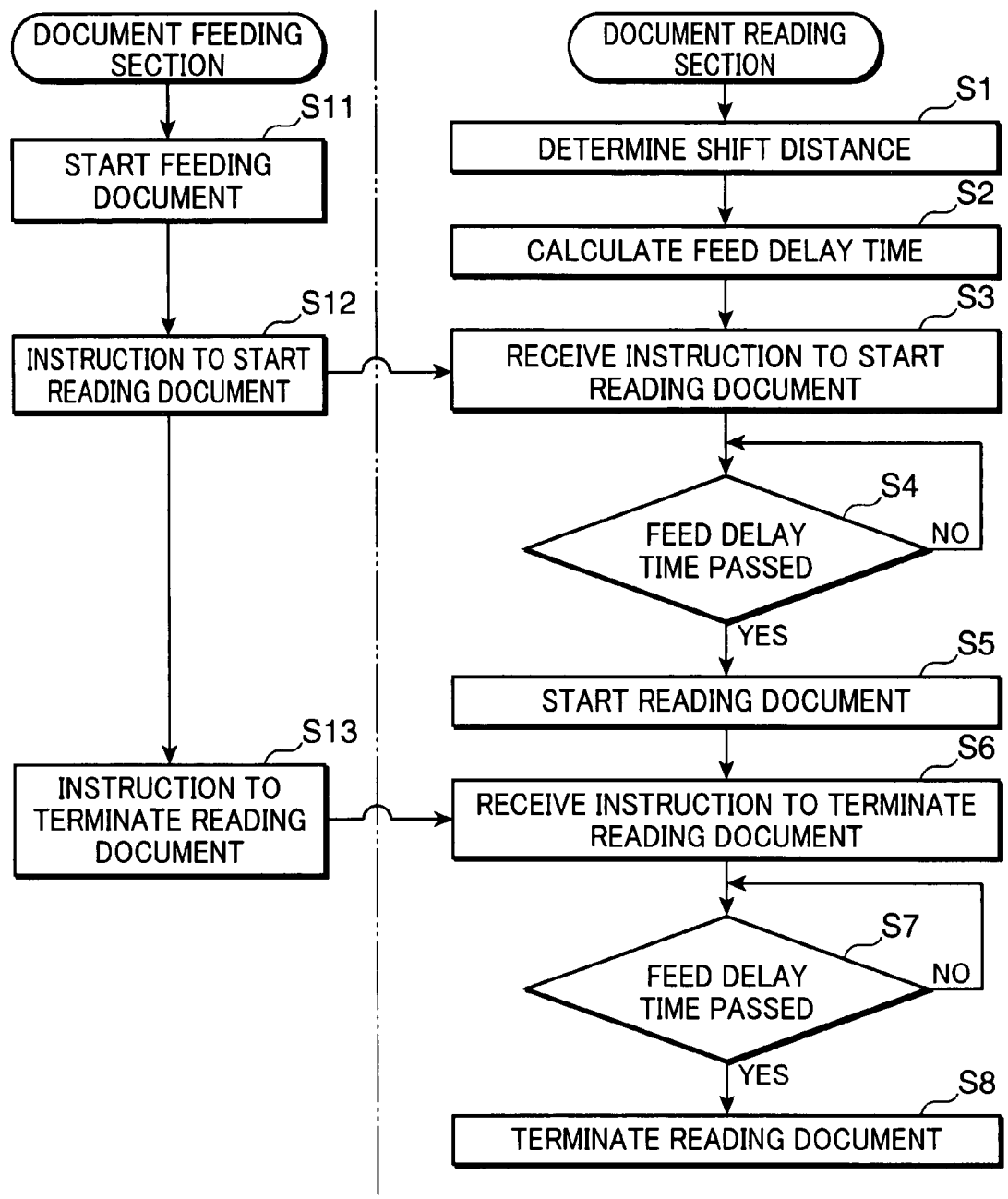
FIG. 4 is a flowchart showing an operation of the image forming apparatus at the time of reading image data.

In step S13 shown in FIG. 4, when the sensor 24 detects the rear end of the document P, the readout signal sender 113 lowers a document readout signal and instructs the document reading section 120 to terminate reading the document P. Next, the ASIC 122 receives the instruction to terminate reading of the document P through the selector 124 (step S6). Next, the ASIC 122 determines whether or not the feed delay time calculated in step S2 has passed after it receives the instruction to terminate reading the document P (step S7). When the feed delay time passes (YES in step S7), the routine proceeds to step S8. When the feed delay time does not pass (NO in step S7), the routine returns to step S7.

Next, the ASIC 122 outputs an instruction to terminate reading the document P to the image sensor 30 through the A/D 121 to allow the image sensor 30 to terminate reading the document P (step S8). In other words, the ASIC 122 transmits the instruction to terminate reading the document P outputted from the readout signal sender 113 to the A/D 121 with a delay of the feed delay time calculated by the delay time calculator 127.

As described above, according to the image forming apparatus, the reading position setter 125 sets the fresh document reading position RP3 on the contact glass 31 at a position where no foreign object F adheres. Then, the shift distance calculator 126 determines the shift distance Z between the upstream-most reading position RP2 and the fresh document reading position RP3. Then, the delay time calculator 127 uses the shift distance Z to find the feed delay time taken by the leading end of the document P to reach the fresh document reading position RP3 after reaching the upstream-most reading position RP2. Then, in the document feeding section 110, the readout signal sender 113 assumes that the document reading position is set to be at the upstream-most reading position RP2 and raises a document readout signal when the leading end of the document P reaches the upstream-most reading position RP2. Then, the readout signal sender 113 outputs an instruction to start reading the document P to the ASIC 122, and the ASIC 122 outputs an instruction to start reading the document with a delay of the feed delay time.

Therefore, the document feeding section 110 can allow the image sensor 30 to start reading the document by just notifying the timing for giving an instruction to start reading the document P to the document reading section 120 when the leading end of the document P reaches the fresh document reading position RP3. Accordingly, the image sensor 30 can read out the document P accurately without transmission of various data between the document feeding section 110 and the document reading section 120.

According to the present invention, the document reading section can allow the image sensor to start reading a document without notifying a shift distance of a document reading position to the document feeding section when the document reaches a refresh document reading position. Accordingly, loss of communication can be prevented so that the image sensor can read the document accurately. Consequently, the loss of communication can be prevented, and successive reading of documents can be performed efficiently.

The present invention can be summarized as follows in accordance with the embodiments described above. Specifically, an image forming apparatus, comprising: a document feeding section for feeding a document at a predetermined feeding speed; and a document reading section for reading a document at a document reading position, the document reading section including: a reading position setter which determines whether or not dirt adheres on an instant document reading position, and sets a fresh document reading position at a location within a predetermined reading position shiftable range of a document feeding path where no dirt adheres when dirt is determined to adhere on the instant document reading position; an image sensor; a shift distance calculator which calculates a shift distance between the fresh document reading position and an upstream end of the reading position shiftable range; a delay time calculator which calculates a delay time based on the feeding speed and the calculated shift distance; and wherein the document feeding section includes a start signal sender which sends a start signal to the document reading section, the start signal being sent when a predetermined portion of the document being fed reaches the upstream end of the reading position shiftable range, and the document reading section further includes a reading controller which allows the image sensor to start reading of the document after the elapse of the delay time from the reception of the start signal.

According to the above-described image forming apparatus, the shift distance calculator of the document reading section determines a shift distance between the upstream-most reading position and the fresh document reading position. The delay time calculator calculates a feed delay time, which is a time taken by feeding the document from the upstream-most reading position to the fresh reading position, based on the determined shift distance. On the other hand, the start signal sender of the document feeding section assumes that the fresh document reading position is set to be at the upstream-most reading position, and instructs the document reading section to start reading a document when the document reaches the upstream-most reading position. The reading controller of the document reading section allows the image sensor to start reading the document when it receives the instruction to start reading the document and the feed delay time passes.

Therefore, the document reading section can allow the image sensor to start reading a document without notifying a shift distance of a document reading position to the document feeding section when the document reaches a fresh document reading position. Accordingly, the loss of communication can be prevented, and successive reading of documents can be performed efficiently. Further, the start signal sender of the document feeding section assumes that the document reading position is set to be at the upstream-most reading position, and it instructs the document reading section to start reading the document. Accordingly, the document reading section can allow the image sensor to start reading the document when the document passes the fresh document reading position regardless of setting of the fresh document reading position.

Further, it is preferable that the reading position setter sets an initial document reading position at a downstream end of the reading position shiftable range, and the shift distance calculator calculates a shift distance by calculating a fresh distance between the initial document reading position and the fresh document reading position, and subtracting the calculated fresh distance from the distance between the initial reading position and the upstream end of the reading position shiftable range.

According to this configuration, since the shift distance is calculated by finding a distance between the initial reading position and fresh document reading position, in other words, by finding an actual moving distance of the document reading position, the shift distance can be calculated accurately by a simple processing.

Further, it is preferable that: the document reading section further includes: a light source for irradiating the document; and a first reflective mirror for receiving a reflected light ray from the document through a contact glass, and leading the reflected light ray to the image sensor, the document reading position is placed on an optical path of the light ray which is reflected from the document, and passed through the contact glass, wherein: and received by the first reflective mirror, and the reading position setter shifts the document reading position toward the upstream of the document feeding path by shifting the first reflective mirror toward the upstream of the document feeding path.

According to this configuration, the fresh document reading position can be set with a simple configuration of moving the first reflective mirror from the initial reading position toward upstream of the document feeding path.

Further, it is preferable that the document reading section further includes a second reflective mirror for leading the reflected light ray from the first reflective mirror to the image sensor, and the reading position setter shifts the second reflective mirror along the document feeding path in accordance with a shift of the first reflective mirror.

According to this configuration, a length of an optical path of a reflected light ray reflected from the document read out at the fresh document reading position can be kept constant.

Further, it is preferable that the reading position setter determines based on image data obtained by the image sensor whether or not dirt adheres on an instant document reading position.

According to this configuration, the determination regarding adherence of dirt on the document reading position can be performed efficiently.

This application is based on Japanese Patent application serial No. 2006-218606 filed in Japan Patent Office on Aug. 10, 2006, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image forming apparatus, comprising:
a document feeding section for feeding a document at a predetermined feeding speed; and
a document reading section for reading a document at a document reading position, the document reading section including:
a reading position setter which determines whether or not dirt adheres on an instant document reading position, and, when the reading position setter determines that dirt adheres on the instant document reading position, the reading position setter sets a fresh document reading position within a predetermined reading position range along a document feeding path where no dirt adheres;
an image sensor;
a distance calculator which calculates a shift distance between the fresh document reading position and an upstream end of the reading position shiftable range; and
a time calculator which calculates a delay time based on the feeding speed and the calculated shift distance, wherein
the document feeding section includes a start signal sender which sends a start signal to the document reading section when a predetermined portion of the document being fed reaches the upstream end of the reading position shiftable range, and
the document reading section further includes a reading controller which allows the image sensor to start reading of the document after elapse of the delay time from the reception of the start signal.

2. The image forming apparatus according to claim 1, wherein
the reading position setter sets an initial document reading position at a downstream end of the reading position shiftable range, and
the distance calculator calculates the shift distance by calculating a fresh distance between the initial document reading position and the fresh document reading position, and subtracting the calculated fresh distance from the distance between the initial reading position and the upstream end of the reading position shiftable range.

3. The image forming apparatus according to claim 1, wherein
the document reading section further includes a light source for irradiating the document, and a first reflective mirror for receiving a reflected light ray from the document through a contact glass, and leading the reflected light ray to the image sensor,
the document reading position is placed on an optical path of the light ray which is reflected from the document, and passed through the contact glass, and received by the first reflective mirror, and
the reading position setter shifts the document reading position upstream along the document feeding path by shifting the first reflective mirror upstream along the document feeding path.

4. The image forming apparatus according to claim 3, wherein
the document reading section further includes a second reflective mirror for leading the reflected light ray from the first reflective mirror to the image sensor, and
the reading position setter shifts the second reflective mirror along the document feeding path in accordance with a shift of the first reflective mirror.

5. The image forming apparatus according to claim 1, wherein the reading position setter determines based on image data obtained by the image sensor whether or not dirt adheres on an instant document reading position.

* * * * *